United States Patent
Touval et al.

[15] 3,678,071
[45] July 18, 1972

[54] N-HALOIMIDES OF POLYHALO SUBSTITUTED POLYHYDROCYCLICDICARBOXYLIC ACIDS

[72] Inventors: Irving Touval, Fords, N.J.; Elmar R. Altwicker, Elnora, N.Y.

[73] Assignee: Universal Oil Products Company, Des Plaines, Ill.

[22] Filed: May 28, 1969

[21] Appl. No.: 828,721

[52] U.S. Cl. ............................260/326 C, 106/15, 252/8.1, 252/51, 260/45.8, 424/274
[51] Int. Cl. ....................................C07d 27/52, C07d 27/28
[58] Field of Search ...............................260/326 C

[56] References Cited

UNITED STATES PATENTS 3,371,099  2/1968  Geiser....................................260/326

*Primary Examiner*—Alex Mazel
*Assistant Examiner*—Joseph A. Narcavage
*Attorney*—James R. Hoatson, Jr. and Raymond H. Nelson

[57] ABSTRACT

Novel compositions of matter comprising N-haloimides of polyhalo substituted polyhydrocyclicdicarboxylic acids, as exemplified by the N-chloroimide of 5,6,7,8,9,9-hexachloro-1, 2, 3, 4, 4a, 5, 8, 8a-octahydro-5, 8-methano-2, 3-naphthalenedicarboxylic acid, are useful as additives to polymeric compositions of matter whereby fire-resistant and flame-retardant properties are added thereto.

6 Claims, No Drawings

N-HALOIMIDES OF POLYHALO SUBSTITUTED POLYHYDROCYCLICDICARBOXYLIC ACIDS

This invention relates to novel compositions comprising N-haloimides of polyhalo substituted polyhydrocyclic-dicarboxylic acids. More particularly, the invention is also concerned with novel compositions of matter comprising a polymeric compound and the aforementioned N-haloimides.

It has now been discovered that novel compounds comprising N-haloimides of polyhalo substituted polydrocyclicdicarboxylic acids may be useful as additives to plastics, polymers, co-polymers, resins, elastomers, rubbers, textiles and fibers (both naturally occurring and synthetic in nature such as wool, cotton, linen, Nylon, Dacron, Rayon, etc.), coatings, paints, varnishes, leather, foams, polyolefins such as polyethylene, polypropylene, polyethylene and polypropylene co-polymers, polystyrenes, polyesters, polyurethane, polyphenyl ethers (polyphenyl oxides), polycarbonates, polyamides, polyoxymethylenes, polyalkylene oxides, such as polyethylene oxide, polypropylene oxide, polyacrylates, polymethacrylates, epoxy resins, acrylonitrile-butadiene-styrene formulations (commonly known as ABS), etc., whereby the desirable physical characteristics of flameproofing or fire retardancy will be imparted to the aforementioned materials. These particular physical characteristics will possess special advantages when preparing plastics, polymers, resins, various rubbers, textiles, etc., which will be utilized in places which may be subjected to excessive heat or to the action of a possible flame, such places including architectural panels for construction work, wall plugs for electrical connections, soundproofing material in walls, ceilings, etc., cushions for various vehicle seats such as airplane seats, automobile seats, bus seats, etc. In addition, the compound when utilized as a constituent of paint, lacquer, varnishes, or protective coatings, films, etc., will also impart a flame resistance to these compounds and, therefore, render them commercially attractive as articles of commerce. Also, besides imparting the desirable physical characteristics of flame retardancy to the various articles of manufacture, the additives will render certain polymeric compositions of matter more stable to color changes and, therefore, will be important components of these compounds whenever it is desirable that discoloration of the finished product is to be avoided or will tend to render such articles unusable. In addition, it is contemplated that the compositions of matter comprising the substituted methanonaphthalene may also be used as an intermediate in the preparation of other chemicals which will act as insecticides or agricultural chemicals.

It is therefore an object of this invention to provide novel compositions of matter which possess desirable physical properties.

Another object of this invention is to provide novel compositions of matter which comprise polymeric products and an N-haloimide of the type hereinafter set forth in greater detail, said finished compositions of matter possessing many desirable physical characteristics which will render said finished articles useful in many fields of commerce.

In one aspect an embodiment of this invention resides in a novel compound comprising an N-haloimide of a polyhalo substituted polyhydrocyclicdicarboxylic acid.

Another embodiment of this invention resides in a composition of matter comprising a polymeric compound and an N-haloimide of a polyhalo substituted polyhydrocyclicdicarboxylic acid.

A specific embodiment of this invention is found in the compound comprising the N-chloroimide of 5,6,7,8,9,9-hexachloro-1,2,3,4a,5,8,8a-octahydro-5,8-methano-2,3,-naphthalenedicarboxylic acid.

Another specific embodiment of this invention is found in the composition of matter comprising a styrenated polyester and the N-bromoimide of 5,6,7,8,9,9-hexachloro-1,2,3,4,4a,5,8,8a-octahydro-5,8-methano-2,3-naphthalenedicarboxylic acid.

Other objects and embodiments will be found in the following further detailed description of the present invention.

As hereinbefore set forth novel compositions of the present invention comprise a haloimide of a halo substituted polyhydrocyclicdicarboxylic acid and to the use thereof as an additive or component with a polymeric compound, the resulting products comprising novel compositions of matter which possess the desirable physical characteristics of being flame-retardant or fire-resistant. For purposes of this invention the term "haloimide of a halo substituted polyhydrocyclicdicarboxylic acid" will refer to compounds which are monocyclic or polycyclic in nature. Any suitable polyhalo substituted polyhydropolycyclicdicarboxylic acid or anhydride thereof may be used in the preparation of the desired composition of matter, said polyhalo substituted polyhydropolycyclicdicarboxylic acid or anhydride thereof being illustrated by the following general formulas:

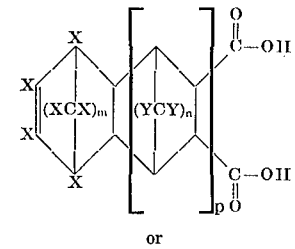

or

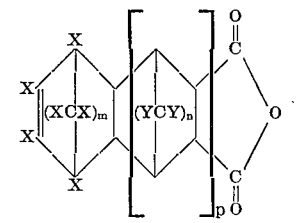

in which X is selected from the group consisting of halogen and particularly chlorine and/or bromine, and hydrogen radicals, at least two of the X's being halogen, Y is also selected from the group consisting of halogen and hydrogen radicals, $m$ is an integer of from 1 to 2, $n$ ranges from 0 to 2 and $p$ ranges from 0 to 1. Representative examples of the polyhalopolyhydrocyclicdicarboxylic acids or anhydrides thereof which may be utilized include 1,4,5,6,7,7-hexachloro-bicyclo-[2.2.1]-5-heptene-2,3-dicarboxylic acid or the anhydride thereof which may be prepared by condensing maleic acid or maleic anhydride with hexachlorocyclopentadiene. Another example of the acid or anhydride which may be used comprises 5,6,7,8,9,9,-hexachloro-1,2,3,4,4a,5,8,8a-octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of a polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9-hexachloro-1,2,3,4,4a,5,8,8a-octahydro-1,4,5,8-dimethano-2,3-naphthalenedicarboxylic acid or anhydride. It is to be understood that other starting materials may also be utilized to form similar acids or anhydrides. Illustrative examples of these starting materials include other acids such as fumaric acid, itaconic acid, citraconic acid, glutaconic acid, etc.; conjugated aliphatic dienes include 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo substituted cycloalkadienes which may be used include 1,2-dichlorocyclopentadiene, 1,2,3-trichlorocyclopentadiene, 1,2,3,4-tetrachlorocyclopentadiene, 1,2,3,4,5-pentachlorocyclopentadiene and similar compounds in which all or part of the chlorine is replaced by other halogen atoms and particularly bromine.

The thus prepared acids or anhydrides are then condensed with ammonia under condensation conditions and preferably in the presence of a substantially inert organic solvent including aromatic hydrocarbons such as benzene, toluene, xylene, etc.; paraffinic hydrocarbons such as N-pentane, N-hexane, N-heptane, etc.; or cyclic paraffins such as cyclopentane, cyclohexane, etc. The condensation conditions which are employed preferably include elevated temperatures in the range of from about 50° to about 250° C. or more, the particular reaction temperature being dependent upon the solvent which is utilized in the reaction, the reaction usually being effected at the reflux temperature of the solvent. The aforementioned condensation process may be effected in any suitable manner and may comprise either a batch or continuous type operation, the reaction period during which the condensation is effected being dependent upon the particular temperature which is employed and will usually range from about 0.5 up to about 5 hours or more.

The novel compound of the present invention is then prepared by treating the imide prepared according to the hereinbefore set forth method with an alkaline hypohalite. Examples of these alkaline hypohalites will include calcium hypochlorite, calcium hypobromite, sodium hypochlorite, sodium hypobromite, potassium hypochlorite, potassium hypobromite, magnesium hypochlorite, magnesium hypobromite, etc. in a manner hereinafter set forth in greater detail. It is also contemplated within the scope of this invention that the haloimide of the acid may be prepared by preparing an alkali salt of the imide such as the sodium salt, potassium salt, lithium salt, etc. and thereafter treating said salt with an elemental halide such as elemental chlorine, elemental bromine, etc. When preparing the haloimide from the alkaline hypochlorite or alkaline hypobromite, the reaction may be effected in a non-aqueous media such as a non-polar solvent at elevated temperatures ranging from about 100° up to about 250° C. or more. Examples of the non-polar solvent will include halogenated aromatic compounds such as chlorobenzene, bromobenzene, o-dichlorobenzene, m-dichlorobenzene, p-dichlorobenzene, etc. The imide of the polyhalo substituted polyhydrocyclicdicarboxylic acid is present in the reaction mixture in a mole ratio of from about 1:1 to about 2:1 moles of imide per mole of alkaline hypohalite. When preparing the haloimide by reacting an alkali metal salt of the imide with halogen, it is preferred, although not necessary, to effect the reaction in an aqueous media, and preferably in an aqueous media which is alkaline in nature. This reaction is usually effected at sub-ambient temperatures, said temperatures ranging from about 0° to about 20° C. and preferably in a range of from about 10° to about 20° C. When utilizing this type of reaction, the halogen may be present in excess over that of the imide, said excess ranging from about 2:1 up to about 5:1 moles of halogen per mold of imide.

The preparation of the desired haloimide of the polyhalo substituted polyhydroyclicdicarboxylic acid by reacting the imide or alkali metal salt thereof with the alkaline hypohalite or elemental halogen may be likewise effected in either a batch or a continuous type operation similar to those operations hereinbefore set forth in greater detail.

The novel compounds of the present invention will possess the generic formula

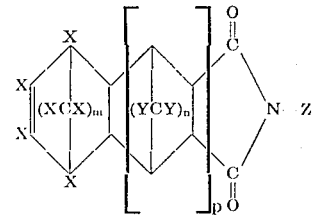

in which X is selected from the group consisting of halogen, and particularly chlorine and/or bromine, and hydrogen radicals, at least two of the X's being halogen, Y is also selected from the group consisting of halogen and hydrogen radicals, Z is a halogen radical, preferably chlorine or bromine, $m$ is an integer of from 1 to 2, $n$ ranges from 0 to 2, and $p$ ranges from 0 to 1. Some specific examples of these haloimides of a polyhalo substituted polyhydrocyclicdicarboxylic acid will include the N-chloroimide of 5,6,7,8,9,9-hexachloro-1,2,3,4,4a,5,8,8a-octahydro-5,8-methano-2,3-naphthalenedicarboxylic acid, the N-bromoimide of 5,6,7,8,9,9-hexachloro-1,2,3,4,4a,5,8,8a-octahydro-5,8-methano-2,3-naphthalenedicarboxylic acid, the N-chloroimide of 5,6,7,8,9,9-hexachloro-1,2,3,4,4a,5,8,8a-octahydro-1,4,5,8-dimethano-2,3-naphthalenedicarboxylic acid, the N-bromoimide of 5,6,7,8,9,9-hexachloro-1,2,3,4,4a,5,8,8a-octahydro-1,4,5,8-dimethano-2,3,-naphthalenedicarboxylic acid, the N-chloroimide of 1,4,5,6,7,7-hexachlorobicyclo-[2.2.1]-5-heptene-2,3-dicarboxylic acid, the N-bromoimide of 1,4,5,6,7,7-hexachlorobicyclo-[2.2.1]-5-heptene-2,3-dicarboxylic acid, the N-chloroimide of 5,6,7,8-tetrachloro-1,2,3,4,4a,5,8,8a-octahydro-5,8-methano-2,3-naphthalenedicarboxylic acid, the N-bromoimide of 5,6,7,8-tetrachloro-1,2,3,4,4a,5,8,8 a-octahydro-5,8-methano-2,3-naphthalenedicarboxylic acid, etc. It is to be understood that the aforementioned haloimides are only representative of the class of compounds which may be prepared, and that the present invention is not necessarily limited thereto.

The novel compounds of the present invention may be admixed with a polymeric compound whereby the desirable physical characteristics such as flame retardancy or fire proofing are added to the finished composition of matter which thus is novel. As hereinbefore set forth, the polymeric compounds will include plastics, polymers, co-polymers, terpolymers, naturally occurring textiles or fabrics, naturally occurring and synthetic rubber, etc. In addition to imparting the desirable characteristics of flame retardancy, the final composition of matter will also possess other advantageous physical properties such as an increased stability against deterioration, weathering, and aging which may have been induced by chemical, physical, biological agents, etc. or by radiation. The N-haloimide of the polyhalo substituted polyhydrocyclic dicarboxylic acid may be added to the polymeric compound in a range of from about 5 to about 50 percent by weight of the polymeric compound to be treated.

The admixing of the compounds may be effected in any manner known in the art. For example, when both the polymeric compound and the N-haloimide of the polyhalo substituted polyhydrocyclicdicarboxylic acid are in a solid state, the two components may be physically admixed in a mixer, by milling, by dissolving the two components in a mutually miscible solvent, etc. The only criterion which must be met in forming the final composition of matter is that the two components are so thoroughly admixed in such a manner so as to impart a uniform degree of the desirable physical characteristics such as flame retardancy, stability, etc. throughout the entire final composition of matter. It is also contemplated within the scope of this invention that further improvements in the flammability characteristics of the final composition of matter may be imparted thereto by the addition of synergistic quantities of other flame retardants such as phosphorus and/or antimony containing compounds. Antimony oxide, phosphate, and phosphite esters are specific examples of these useful compounds. As a specific example, the N-haloimide of a polyhalo substituted polyhydrocyclicdicarboxylic acid may be admixed with a styrenated polyester following which a free radical generating catalyst is then added and the resulting mixture is heated at an elevated temperature. In addition, the N-haloimide of the polyhalo substituted polyhydrocyclicdicarboxylic acid may also be used as an additive for imparting its flame retarding properties or it also may be co-polymerized with a reactive substituent and firmly bound in a polymeric product. Examples of other polymeric products which may be treated with the N-haloimide of the present invention will include epoxy resins, a specific example being the condensation product of epichlorohydrin and Bisphenol-A. The epoxy resin in an uncured state will usually be thermoplastic and may range from low viscosity liquids to high melting point brittle solids. The desired resin may be cured by mixing the N-haloimide of the polyhalo substituted polyhydrocyclicdicarboxylic acid with the resin and thereafter curing the mixture in the usual manner by treatment at an elevated temperature for a predetermined period of time in the presence of a proper curing agent. The resultant product will have the physical characteristics thereof altered to the desired values as pertains to flame retardancy, color stability, etc. and thus may be utilized for various purposes such as floor surfacings, coatings, etc. In addition, the N-haloimides of the present invention may also be used as a component of a novel composition of matter along with polymers of acrylonitrile, butadiene, and styrene (commonly known as ABS) as well as synthetic materials such as various nylons, Rayon, Dacron, etc.

Some illustrative examples of the novel compositions of matter comprising a polymeric compound and N-haloimide of a polyhalo substituted polyhydrocyclicdicarboxylic acid will include polyethylene and the N-chloroimide of 5,6,7,8,9,9-hexachloro-1,2,3,4,4a,5,8,8a-octahydro-5,8-methano-2,3-naphthalenedicarboxylic acid, polypropylene and the N-chloroimide of 5,6,7,8,9,9-hexachloro-1,2,3,4,4a,5,8,8a-octahydro-5,8-methano-2,3-naphthalenedicarboxylic acid, ABS and the N-chloroimide of 5,6,7,8,9,9-hexachloro-1,2,3,4,4a,5,8,8a-octahydro-5,8-methano-2,3-naphthalenedicarboxylic acid, Nylon and the N-chloroimide of 5,6,7,8,9,9-hexachloro-1,2,3,4,4a,5,8,8a-octahydro-5,8-methano-2,3-naphthalenedicarboxylic acid, Rayon and the N-chloroimide of 5,6,7,8,9,9-hexachloro-1,2,3,4,4a,5,8,8a-octahydro-5,8-methano-2,3-naphthalenedicarboxylic acid, an epoxy resin and the N-chloroimide of 5,6,7,8,9,9-hexachloro-1,2,3,4,4a,5,8,8a-octahydro-5,8-methano-2,3-naphthalenedicarboxylic acid, a polyester and the N-chloroimide of 5,6,7,8,9,9-hexachloro-1,2,3,4,4a,5,8,8a-octahydro-5,8-methano-2,3-naphthelenedicarboxylic acid, polyisoprene and the N-chloroimide of 5,6,7,8,9,9-hexachloro-1,2,3,4,4a,5,8,8a-octahydro-5,8-methano-2,3-naphthalenedicarboxylic acid, polyphenylene oxide and the N-chloroimide of 5,6,7,8,9,9-hexachloro-1,2,3,4,4a,5,8,8a-octahydro-5,8-methano-2,3-naphthalenedicarboxylic acid, polyoxymethylene and the N-chloroimide of 5,6,7,8,9,9-hexachloro-1,2,3,4,4a,5,8,8a-octahydro-5,8-methano-2,3-naphthalenedicarboxylic acid, polyethylene and the N-chloroimide of 5,6,7,8,9,9-hexachloro-1,2,3,4,4a,5,8,8a-octahydro-1,4,5,8-dimethano-2,3-naphthalenedicarboxylic acid, polypropylene and the N-chloroimide of 5,6,7,8,9,9-hexachloro-1,2,3,4,4a,5,8,8a-octahydro-1,4,5,8-dimethano-2,3-naphthalenedicarboxylic acid, ABS and the N-chloroimide of 5,6,7,8,9,9-hexachloro-1,2,3,4,4a,5,8,8a-octahydro-1,4,5,8-dimethano-2,3-naphthalenedicarboxylic acid, Nylon and the N-chloroimide of 5,6,7,8,9,9-hexachloro-1,2,3,4,4a,5,8,8a-octahydro-1,4,5,8-dimethano-2,3-naphthalenedicarboxylic acid, Rayon and the N-chloroimide of 5,6,7,8,9,9-hexachloro-1,2,3,4,4a,5,8,8a-octahydro-1,4,5,8-dimethano-2,3-naphthalenedicarboxylic acid, an epoxy resin and the N-chloroimide of 5,6,7,8,9,9-hexachloro-1,2,3,4,4a,5,8,8a-octahydro-1,4,5,8-dimethano-2,3-naphthalenedicarboxylic acid, a polyester and the N-chloroimide of 5,6,7,8,9,9-hexachloro-1,2,3,4,4a,5,8,8a-octahydro-1,4,5,8-dimethano-2,3-naphthalenedicarboxylic acid, polyisoprene and the N-chloroimide of 5,6,7,8,9,9-hexachloro-1,2,3,4,4a,5,8,8a-octahydro-1,4,5,8-dimethano-2,3-naphthalenedicarboxylic acid, polyphenylene oxide and the N-chloroimide of 5,6,7,8,9,9-hexachloro-1,2,3,4,4a,5,8,8a-octahydro-1,4,5,8-dimethano-2,3-naphthalenedicarboxylic acid, polyoxymethylene and the N-chloroimide of 5,6,7,8,9,9-hexachloro-1,2,3,4,4a,5,8,8a-octahydro-1,4,5,8-dimethano-2,3-naphthalenedicarboxylic acid, polyethylene and the N-chloroimide of 1,2,3,4,7,7-hexachlorobicyclo-[2.2.1]-5-heptene-2,3-dicarboxylic acid, polypropylene and the N-chloroimide of 1,2,3,4,7,7-hexachlorobicyclo-[2.2.1]-5-heptene-2,3-dicarboxylic acid, ABS and the N-chloroimide of 1,2,3,4,7,7-hexachlorobicyclo-[2.2.1]-5-heptene-2,3-dicarboxylic acid, Nylon and the N-chloroimide of 1,2,3,4,7,7-hexachlorobicyclo-[2.2.1]-5-heptene-2,3-dicarboxylic acid, Rayon and the N-chloroimide of 1,2,3,4,7,7-hexachlorobicyclo-[2.2.1]-5-heptene-2,3-dicarboxylic acid, an epoxy resin and the N-chloroimide of 1,2,3,4,7,7-hexachlorobicyclo-[2.2.1]-5-heptene-2,3-dicarboxylic acid, a polyester and the N-chloroimide of 1,2,3,4,7,7-hexachlorobicyclo-[2.2.1]-5-heptene-2,3-dicarboxylic acid, polyisoprene and the N-chloroimide of 1,2,3,4,7,7-hexachlorobicyclo-[2.2.1]-5-heptene-2,3-dicarboxylic acid, polyphenylene oxide and the N-chloroimide of 1,2,3,4,7,7-hexachlorobicyclo-[2.2.1]-5-heptene-2,3-dicarboxylic acid, polyoxymethylene and the N-chloroimide of 1,2,3,4,7,7-hexachlorobicyclo-[2.2.1]-5-heptene-2,3-dicarboxylic acid, etc., the corresponding N-bromoimides of the aforementioned acids with the polymeric products, the N-chloroimides of polybromo substituted acids, etc. It is to be understood that the aforementioned novel compositions of matter are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

To a 500 cc. flask equipped with a stirrer, thermometer, and reflux condenser were charged 42 g. (0.10 mole) of the imide of 5,6,7,8,9,9-hexachloro-1,2,3,4,4a,5,8,8a-octahydro-5,8-methano-2,3-naphthalenedicarboxylic acid, 20 g. (0.17 mole) of calcium hypochlorite, and 650 g. of o-dichlorobenzene. The resulting slurry was heated to a temperature of 125° C. and maintained in a range of from 125° to 130° C. for a period of eight hours. At the end of this time the resulting greenish slurry was cooled to 100° C. and filtered by gravity. The solution was then heated to a temperature of 140° C. at 15 mm. pressure to remove the solvent. Following this the orange oily residue was slurried with 100 cc. of hexane and crystallized. The resulting solids were removed by filtration and washed with 50 cc. of hexane, following which the product was air dried. There was recovered 37 g. of the N-chloroimide of 5,6,7,8,9,9-hexachloro-1,2,3,4,4a,5,8,8a-octahydro-5,8-methano-2,3-naphthalenedicarboxylic acid. The structure of the product was verified by both spectral and wet analysis.

EXAMPLE II

In this experiment the desired N-bromoimide of 5,6,7,8,9,9-hexachloro-1,2,3,4,4a,5,8,8a-octahydro-5,8-methano-2,3-naphthalenedicarboxylic acid was prepared by charging 42 g. (0.1 mole of the imide of 5,6,7,8,9,9-hexachloro-1,2,3,4,4a,5,8,8a-octahydro-5,8-methano-2,3-naphthalenedicarboxylic acid, 16.5 g. (0.35 mole) of potassium hydroxide, and 600 cc. of water to a one-liter flask. The solution was stirred for one hour to dissolve the solids and thereafter cooled to 20° C. by means of an ice bath. Following this 30 g. (0.38 mole) of elemental bromine were added during a period of ten minutes while maintaining the temperature of the solution in a range of from 15° to 20° C. The resulting light yellow slurry was stirred for one hour at room temperature following which the solids were filtered, washed with water, and dried in a vacuum oven at 100° C. and 10 mm. pressure. There was obtained 50 g. of the N-bromoimide of 5,6,7,8,9,9-hexachloro-1,2,3,4,4a,5,8,8a-octahydro-5,8-methano-2,3-naphthalenedicarboxylic acid.

EXAMPLE III

In this example a mixture of 43.5 g. (0.1 mole) of the imide of 5,6,7,8,9,9-hexachloro-1,2,3,4,4a,5,8,8a-octahydro-1,4,5,8-dimethano-2,3-naphthalenedicarboxylic acid, 20 g. of calcium hypochlorite and 650 g. of o-dichlorobenzene is charged to a 500 cc. flask equipped with a stirrer, thermometer, and reflux condenser. The slurry is heated to a temperature of 140° C. and maintained at this temperature for a period of two hours. At the end of this time the slurry is allowed to cool to 100° C. and filtered to remove the solids. The filtrate is then reheated to a temperature of 140° C. at a reduced pressure to remove the solvent. After the solvent is removed the residue is slurried with hexane and crystallized. The crystals are then removed by filtration, washed with an additional amount of hexane and air dried to yield a desired product comprising the N-chloroimide of 5,6,7,8,9,9-hexachloro-1,2,3,4,4a,5,8-octahydro-1,4,5,8-dimethano-2,3-naphthalenedicarboxylic acid.

EXAMPLE IV

A mixture of 37 g. (0.1 mole) of the imide of 1,4,5,6,7,7-hexachlorobicyclo-[2.2.1]-5-heptene-2,3-dicarboxylic acid, 16.5 g. of potassium hydroxide, and 600 cc. of water is charged to a one-liter flask and stirred for a period of one hour to dissolve the solids. The solution is then cooled to 20° C. and 20 g. of chlorine is charged thereto, the solution being maintained at subambient temperatures during the addition of the chlorine. At the end of one hour during which time the mixture is continuously stirred at room temperature, the resulting solids are filtered, washed with water, and dried in a vacuum oven at an elevated temperature of 100° C. and a reduced pressure to yield the desired product comprising the N-chloroimide of 1,4,5,6,7,7-hexachlorobicyclo-[2.2.1]-5-heptene-2,3-dicarboxylic acid.

EXAMPLE V

A polypropylene maleate phthalate polyester is prepared by admixing maleic anhydride, phthalic anhydride, and propylene glycol along with xylene and hydroquinone at an elevated temperature. After the reaction is completed, the resulting mixture is cooled and styrene is added.

The resulting styrenated polyester resin is admixed with the N-chloroimide of 5,6,7,8,9,9-hexachloro-1,2,3,4,4a,5,8,8a-octahydro-5,8-methano-2,3-naphthalenedicarboxylic acid which is prepared according to Example I above along with a small amount of a cobalt accelerator and a peroxide, cast into molds and cured at an elevated temperature.

To illustrate the ability of the chloroimide to act as a flame retardant, the styrenated polyester which does not contain the N-chloroimide is subjected to a combustion test as is the styrenated polyester which contains the flame retardant additive. This combustion test is effected in an apparatus similar to the one described by C. P. Fenimore and J. F. Martin in the November, 1966 issue of Modern Plastics. The strip of styrenated polyester which does not contain the N-chloroimide will have an oxygen index (the lowest mole fraction of oxygen sufficient to maintain combustion) of $n=0.190$. In contrast to this, the strip of styrenated polyester which has had the N-chloroimide added thereto will have an oxygen index of value in excess of 0.190.

EXAMPLE VI

A commercial high molecular weight polyethylene is milled with the N-bromoimide of 5,6,7,8,9,9-hexachloro-1,2,3,4,4a,5,8,8a-octahydro-5,8-methano-2,3-naphthalenedicarboxylic acid in a ratio of 100 g. of polyethylene per 10 g. of the N-bromoimide. This mixture is pressed into strips while the untreated polyethylene is also cut into strips of similar length and width. The untreated polyethylene is subjected to a combustion test similar to that described in Example V above, as is the strip of polyethylene which has been admixed with the N-bromoimide. It will be found that the oxygen index of the untreated polyethylene will be substantially less than the strip which comprises the mixture of polyethylene and the N-bromoimide of 5,6,7,8,9,9-hexachloro-1,2,3,4,4a,5,8,8a-octahydro-5,8-methano-2,3-naphthalenedicarboxylic acid.

EXAMPLE VII

A polymeric composition of matter is prepared by admixing a co-polymer commonly known as ABS (a polymer comprising acrylonitrile, butadiene, and styrene) with the N-chloroimide of 1,4,5,6,7,7-hexachlorobicyclo-[2.2.1]-5-heptene-2,3-dicarboxylic acid. This novel composition of matter is subjected to a combustion test similar to that hereinbefore set forth. It will be found that the oxygen index of this novel composition of matter will be greater than the oxygen index of an ABS polymer which does not contain the aforementioned N-chloroimide.

We claim as our invention:

1. A compound of the formula

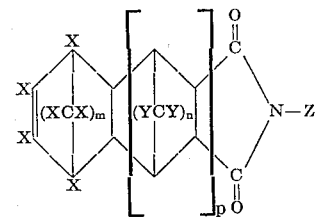

in which X is selected from the group consisting of halogen, and hydrogen radicals, at least 2 of the X's being halogen, Y is also selected from the group consisting of halogen and hydrogen radicals, Z is a halogen radical, $m$ is an integer of from 1 to 2, $n$ ranges from 0 to 2, and $p$ ranges from 0 to 1.

2. A compound of the formula

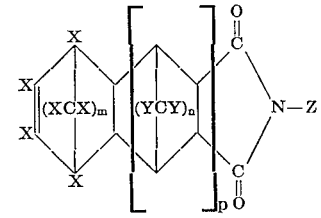

in which X is selected from the group consisting of chlorine, bromine, and hydrogen radicals, at least 2 of the X's being selected from the group consisting of chlorine and bromine, Y is also selected from the group consisting of chlorine, bromine, and hydrogen radicals, Z is selected from the group consisting of chlorine and bromine, $m$ is an integer of from 1 to 2, $n$ ranges from 0 to 2 and $p$ ranges from 0 to 1.

3. The compound of claim 2 being the N-chloro-imide of 5,6,7,8,9,9-hexachloro-1,2,3,4,4a,5,8,8a-octahydro-5,8-methano-2,3-naphthalenedicarboxylic acid.

4. The compound of claim 2 being the N-bromoimide of 5,6,7,8,9,9-hexachloro-1,2,3,4,4a,5,8,8a-octahydro-5,8-methano-2,3-naphthalenedicarboxylic acid.

5. The compound of claim 2 being the N-chloroimide of 5,6,7,8,9,9-hexachloro-1,2,3,4,4a,5,8,8a-octahydro-1,4,5,8-dimethano-2,3-naphthalenedicarboxylic acid.

6. The compound of claim 2 being the N-chloroimide of 1,4,5,6,7,7-hexachlorobicyclo-[2.2.1]-5-heptene-2,3-dicarboxylic acid.

\* \* \* \* \*